(12) United States Patent
Jensen et al.

(10) Patent No.: US 11,402,638 B2
(45) Date of Patent: Aug. 2, 2022

(54) AUGMENTED REALITY APPARATUS

(71) Applicant: MAERSK DRILLING A/S, Kongens Lyngby (DK)

(72) Inventors: Jakob Valentin Jensen, Holte (DK); Andreas Tycho, Vallensbæk (DK); Kristian Andreasen, Århus (DK)

(73) Assignee: MAERSK DRILLING A/S, Kongens Lyngby (DK)

( * ) Notice: Subject to any disclaimer, the term of this patent is extended or adjusted under 35 U.S.C. 154(b) by 136 days.

(21) Appl. No.: 17/053,097

(22) PCT Filed: May 7, 2019

(86) PCT No.: PCT/DK2019/050141
§ 371 (c)(1),
(2) Date: Nov. 5, 2020

(87) PCT Pub. No.: WO2019/214789
PCT Pub. Date: Nov. 14, 2019

(65) Prior Publication Data
US 2021/0072549 A1 Mar. 11, 2021

(30) Foreign Application Priority Data
May 8, 2018 (DK) .......................... PA 2018 00204

(51) Int. Cl.
*G02B 27/01* (2006.01)
*G06F 3/01* (2006.01)
*G06F 1/16* (2006.01)
*H02K 5/136* (2006.01)

(52) U.S. Cl.
CPC .... *G02B 27/0172* (2013.01); *G02B 2027/014* (2013.01); *G02B 2027/0138* (2013.01); *G02B 2027/0178* (2013.01)

(58) Field of Classification Search
USPC .......................................................... 359/630
See application file for complete search history.

(56) References Cited

U.S. PATENT DOCUMENTS

2002/0196202 A1* 12/2002 Bastian .................. G09G 3/003
345/8
2006/0225328 A1* 10/2006 Hasan ..................... G09F 13/18
40/570

(Continued)

FOREIGN PATENT DOCUMENTS

EP 2642331 A1 9/2013

OTHER PUBLICATIONS

International Search Report and Written Opinion issued in corresponding International Patent Application No. PCT/DK2019/050141, 11 pages (dated Aug. 5, 2019).

*Primary Examiner* — Chineyere D Wills-Burns
(74) *Attorney, Agent, or Firm* — Buchanan Ingersoll & Rooney PC (57) ABSTRACT

An augmented reality apparatus for use in a hazardous area comprises a display unit for providing information within a user's field of view. The augmented reality apparatus also comprises a controller configured to control the display. The controller is configured modify the mode of operation of the display unit in dependence of location information indicating that the augmented reality apparatus is in the hazardous area.

14 Claims, 4 Drawing Sheets

(56) References Cited

U.S. PATENT DOCUMENTS

| | | | |
|---|---|---|---|
| 2013/0147621 A1* | 6/2013 | Kwong | A62B 3/00 |
| | | | 340/521 |
| 2014/0145914 A1* | 5/2014 | Latta | G06F 3/013 |
| | | | 345/8 |
| 2015/0067580 A1 | 3/2015 | Um et al. | |
| 2016/0261905 A1* | 9/2016 | Aruga | G02B 27/0172 |
| 2017/0032221 A1 | 2/2017 | Wu et al. | |
| 2017/0152729 A1* | 6/2017 | Gleitman | E21B 47/00 |
| 2017/0322421 A1* | 11/2017 | Hunter | G06F 3/01 |
| 2018/0191769 A1* | 7/2018 | Anderson | H04L 63/1441 |
| 2018/0322783 A1* | 11/2018 | Toyoda | B60W 50/14 |
| 2019/0204599 A1* | 7/2019 | Abbott | G06T 19/006 |
| 2019/0340819 A1* | 11/2019 | Chandrashekarappa | |
| | | | G06F 9/451 |
| 2020/0225730 A1* | 7/2020 | Benson | G06F 1/3218 |

\* cited by examiner

AUGMENTED REALITY APPARATUS

BACKGROUND OF THE APPLICATION

The present invention relates to augmented reality apparatus. In particular, the present invention relates to augmented reality apparatus for use in a hazardous area, such as for inspections and maintenance of equipment, functioning as a heads up display while operating equipment, or otherwise providing useful information in an industrial setting such as providing visual guiding and augmenting the wearers view with information regarding the equipment and/or processes in view.

It is known to use apparatus which are user wearable to provide information to the user. The user wearable apparatus can be glasses or goggles which comprise a camera (or other device(s) allows the determination of the field of view) and a "heads-up" display. The heads-up display provides information to the user within the user's normal field of view 66.

In industrial applications, the apparatus is particularly useful for providing information of the immediate environment to work personnel. For example, the heads-up display can overlay visual information to "augment" the user's normal field of view. Such devices are also known as providing an "augmented reality", or mixed reality or extended Reality experience to the user.

Known augmented reality applications provide information to the user based on detection of the user's environment. Maintenance and inspection tasks in the industrial environment can be made safer and quicker with augmented reality applications because the user can have both hands free.

However, some industrial environments may be hazardous and additional precautions are needed when users operate in these hazardous environments. For example, in the vicinity of a wellbore or a drilling unit in operation, there may be explosive or flammable gases, liquids or powders. Safe operating regulations require that electronics and other electrical devices must be specially designed and tested to ensure it does not initiate an explosion, due to sparks or high surface temperature of equipment either as part of normal operation or potential failures. To this end equipment is often designed to be either intrinsically safe or shielded from the environment.

Known intrinsically safe goggles with data display, user input and data communications are disclosed in US 2017/032221. The goggles operate with a low voltage and/or current so that ignition of a hazardous environment cannot occur. The goggles are further designed with safety barriers to isolate the device from the hazardous area.

In practice, this means that the battery and other components such as wiring, capacitors, resistors are wrapped and shielded in a significant amount of cladding and housing to make them explosion proof. In other words, in order to create an intrinsically safe and explosion proof augmented reality goggles, a large amount of material is required which increases the weight and the volume of the goggles.

Users have found that wearing visual apparatus which are intrinsically safe and explosion proof are uncomfortable and unwieldly. This means that the maintenance personal can refuse to use the augmented reality goggles and rely on other solutions, often requiring one hand to hold the device. Depending on the how hazardous the environment is, sufficient shieldning may even make the googles impractical to wear. Accordingly, while practical googles are viable for zone 2 (discussed below) sufficient protection for zone 1 is likely to render googles impractical.

SUMMARY

Embodiments of the present invention aim to address the aforementioned problems.

According to an aspect of the present invention there is an augmented reality apparatus for use in a hazardous area comprising: a display unit for providing information within a user's field of view; and a controller configured to control the display; wherein the controller is configured modify the mode of operation of the display unit in dependence of location, or visually recognizable information indicating that the augmented reality apparatus is in the hazardous area.

Optionally, the controller is configured to modify the display unit to a low power mode or an inactive mode.

Optionally, the display unit is mounted in a set of glasses, goggles or contact lenses.

Optionally, the controller is mounted in a housing arranged to shield the controller from the hazardous area, wherein the housing is remote from the display.

Optionally, a power source is mounted in a housing arranged to shield the controller from the hazardous area, wherein the housing remote from the display and the power source is connected to the controller and the display unit.

Optionally, when the augmented reality apparatus is in the hazardous area, the display unit is in a low voltage mode, a low current mode or switched off.

Optionally, the augmented reality apparatus comprises at least one sensor for detecting the location of the augmented reality apparatus.

Optionally, wherein the at least one sensor is one or more of the following: a camera, an infrared detector, a microphone, a wireless receiver, a hall sensor, a temperature sensor, a pressure sensor, a radio frequency detector, a global positioning system sensor, or an accelerometer.

Optionally, the augmented reality apparatus comprises a location module configured to process location information of the augmented reality apparatus.

Optionally, the location module is configured to detect an external signal to determine when the augmented reality apparatus enters and is in a hazardous area.

Optionally, the external signal is a beacon indicating the boundary of the hazardous area.

Optionally, the location module is configured to determine the location hazardous environment from a camera mounted on the augmented reality apparatus.

Optionally, the controller is configured to modify the mode of the display unit when the augmented reality apparatus leaves the hazardous area.

Optionally, the controller modifies the mode of the display unit from an inactive mode or a low power mode to an active mode.

Optionally, the hazardous area is an area with a zone classification of zone 0, zone 1 or zone 2 or an atmosphere having a dust with a zone classification of zone 20, zone 21 or zone 22. Of the hazardous area will be an area that is more hazardous than the surrounding areas e.g. the hazardous area is zone 1 where the surroundings are zone 2. In some embodiment, the display unit is rated for a hazardous zone that is less hazardous than the hazardous area, such as the display unit being rated for zone 2 where the hazardous area is zone 1.

Optionally, the controller modifies the mode of operation of the display unit in dependence of the type of hazardous area.

In another aspect there is provided an augmented reality apparatus for use in a hazardous area comprising: a display unit for providing information within a user's field of view; and a controller configured to control the display; and a battery connected to the display unit and the controller wherein the battery is mounted in an external housing remote from the display unit and the housing shields the battery from the hazardous area such that the battery is unsusceptible to the generation of sparks in the hazardous area.

In some embodiments the augmented reality apparatus is formed by an external controller/computation unit and the display unit. The power consumption of the display unit may be reduced by external controller when the display unit enter the hazardous area to a level where the display unit is intrinsicly safe.

Various other aspects and further embodiments are also described in the following detailed description and in the attached claims with reference to the accompanying drawings, in which:

DETAILED DESCRIPTION OF THE PREFERRED EMBODIMENTS

Figure 1:
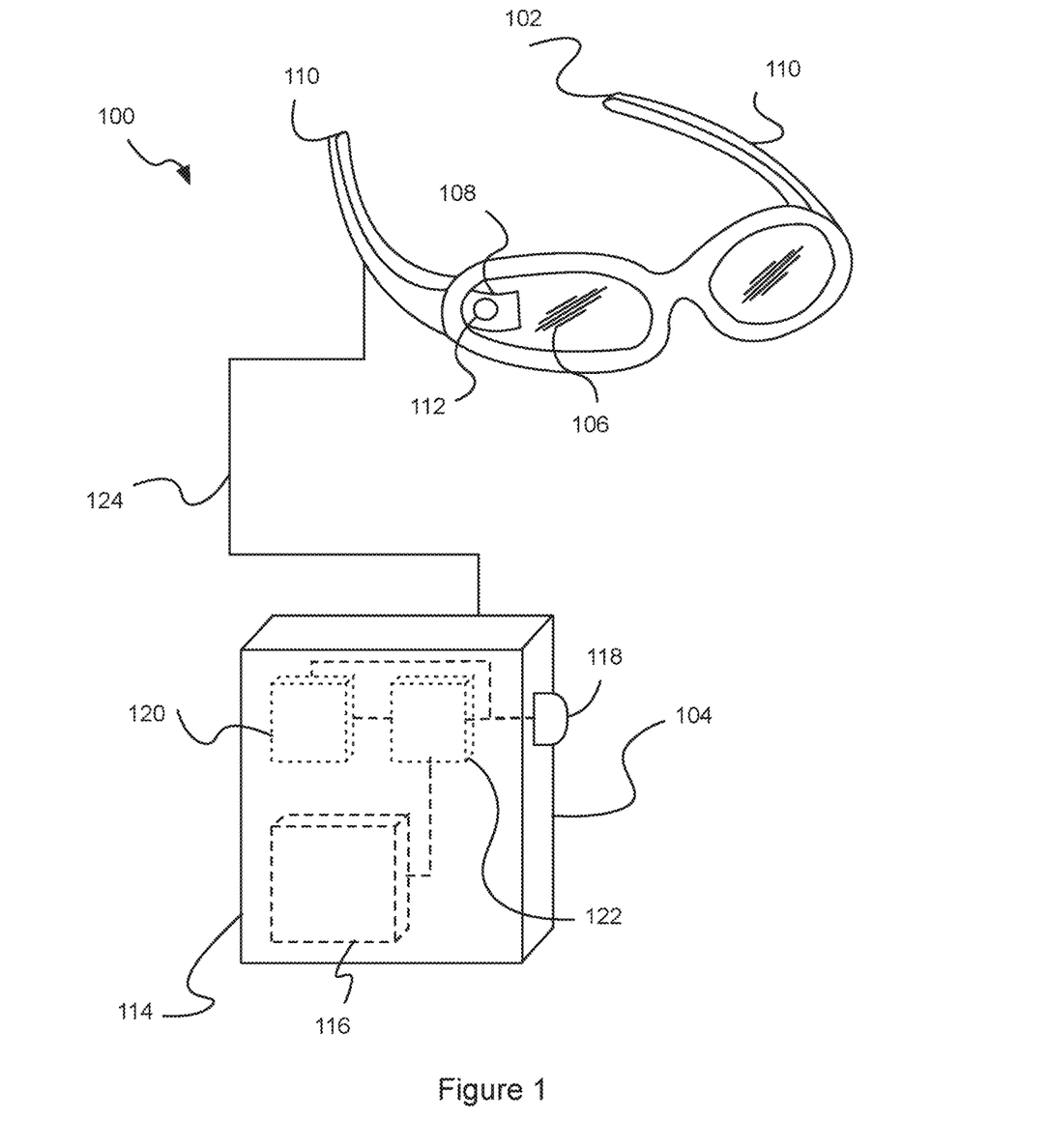
FIG. 1 shows a schematic view of the augmented reality apparatus.

FIG. 1 shows a schematic view of the augmented reality apparatus 100. The augmented reality apparatus 100 is a user wearable device for providing information to the user. The augmented reality apparatus 100 is for use in an industrial environment so that users can easily retrieve, access and store data relating tasks to be carried out by the user. For example, the user may be carrying maintenance or an inspection of equipment.

The user may have to enter restricted and hazardous environments. In this case, the user must wear the appropriate personal protective equipment. In extremely hazardous environments the user may have to take other precautions in order to reduce the risk of an accident.

Health and safety regulation have recognised that certain environments can be more hazardous to personnel than other environments. For example, an environment with hazardous gas, vapour or mist can be classified into the following zones.

Zone 0

A place in which an explosive atmosphere consisting of a mixture with air of dangerous substances in the form of gas, vapour or mist is present continuously or for long periods or frequently.

Zone 1

A place in which an explosive atmosphere consisting of a mixture with air of dangerous substances in the form of gas, vapour or mist is likely to occur in normal operation occasionally.

Zone 2

A place in which an explosive atmosphere consisting of a mixture with air of dangerous substances in the form of gas, vapour or mist is not likely to occur in normal operation but, if it does occur, will persist for a short period only. Similarly, an environment with hazardous dust in the atmosphere can be classified into the following zones.

Zone 20

A place in which an explosive atmosphere in the form of a cloud of combustible dust in air is present continuously, or for long periods or frequently.

Zone 21

A place in which an explosive atmosphere in the form of a cloud of combustible dust in air is likely to occur in normal operation occasionally.

Zone 22

A place in which an explosive atmosphere in the form of a cloud of combustible dust in air is not likely to occur in normal operation but, if it does occur, will persist for a short period only.

Accordingly, if an industrial environment is hazardous such that it can be classified into one of the aforementioned zones, then the atmosphere is at risk of igniting and/or exploding. This means that equipment used in a hazardous area must be explosion proof. Explosion proof means that the device is configured to minimise the chances of a spark being generated in the hazardous environment.

Figure 2:
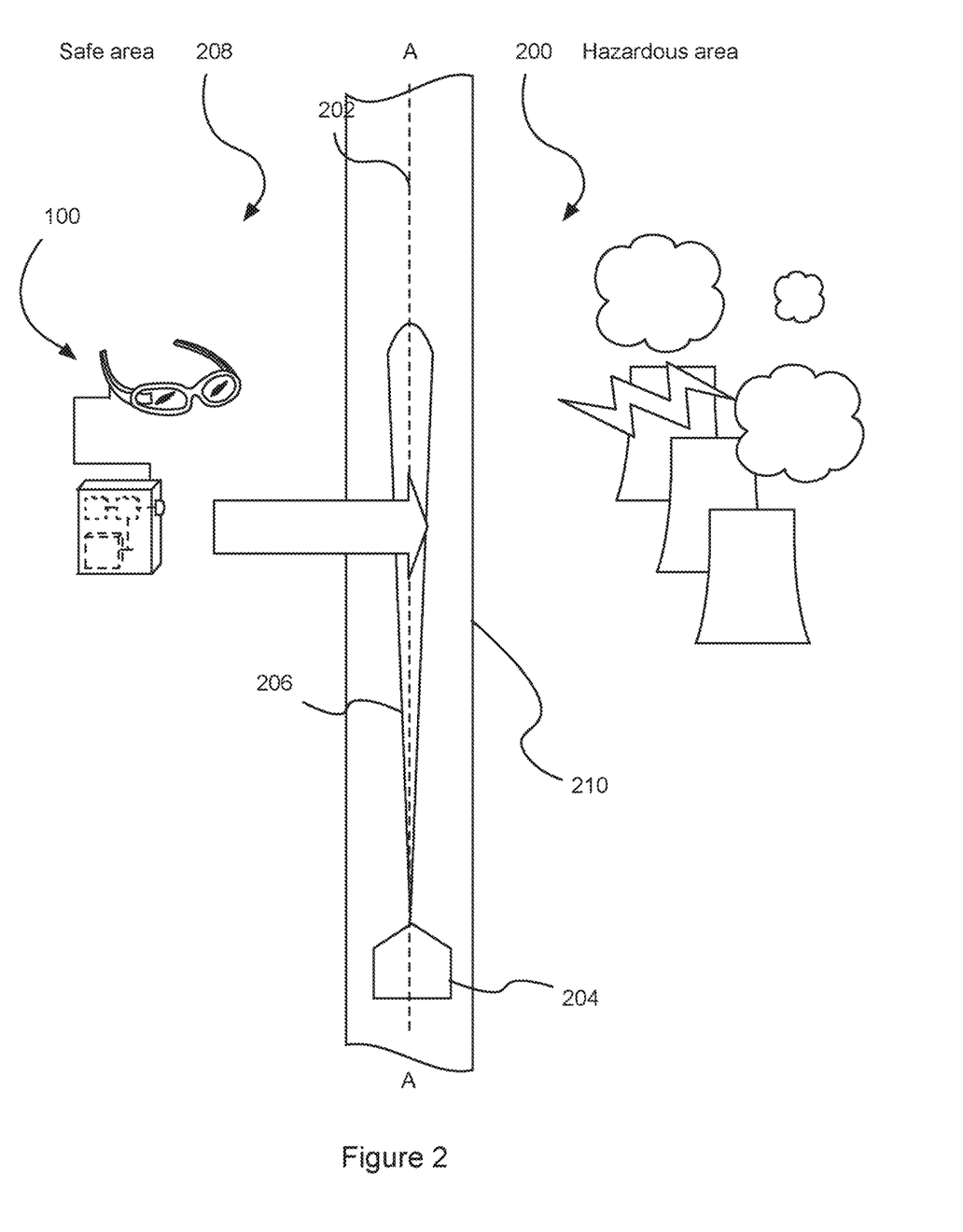
FIG. 2 shows a schematic view of the augmented reality apparatus moving into a hazardous area.

In particular, if the user has a portable device, such as the augmented reality apparatus 100, then the portable device is zone 1 rated to ensure that a user does not inadvertently bring the device into a zone 1 hazardous area 200 (as shown in FIG. 2).

Turning back to FIG. 1, the augmented reality apparatus 100 will now be discussed in further detail. The apparatus 100 comprises a display unit 102 and a controller unit 104. In some embodiments, the display unit 102 is a wearable display unit such as a set of glasses or goggles as shown in FIG. 1. In some other embodiments, the display unit 102 is a portable device (not shown) such as a smartphone or tablet. The portable device can be strapped to the user's arm to allow the user to have both hands free. In some embodiments the display unit 102 can be any suitable form which is wearable by the user.

As shown in FIG. 1, the display unit 102 is mounted within a pair of glasses. Hereinafter the display unit 102 will be referred to as glasses 102, although the display unit 102 is not limited to glasses as mentioned above. The glasses 102 comprise at least one lens 106 and at least one LCD 108 display mounted on the lens 106. The LCD 108 is mounted on the lens 106 such that the LCD projects information into the user's normal field of view. The display unit 102 as shown in FIG. 1 comprises a single LCD display 108. However, in other embodiments both lens 106 of the glasses 102 can comprise LCD displays 108.

The glasses 102 comprise arms 110 so that the glasses can be worn like a normal pair of glasses. Additional straps or ties can be attached to the glasses 102 to prevent the glasses being accidentally dropped by the user. In alternative embodiments, the glasses 102 comprise a monocle arrangement with only one lens 106 and LCD display 108. In this way, the monocle arrangement may need to be strapped to the user's head.

The glasses 102 can comprise one or more sensors for detecting parameters of the environment. In some embodiments the glasses 102 comprise a camera 112 for recording the field of view of user. In other embodiments, the one or more sensors 112 is one or more of the following: a camera, an infrared detector, a microphone, a wireless receiver, a hall sensor, a temperature sensor, a pressure sensor, a radio frequency detector, a global positioning system sensor, or an accelerometer.

The glasses 102 are connected to a controller unit 104. The controller unit 104 is remote from glasses 102 and mounted in a housing 114. In other embodiments, one or more components of the controller unit 104 can be located in the glasses 102. For example, a processor (not shown) can be located in the glasses 102 so that some or all of the processing is carried out in the glasses 102.

The housing 114 shields the controller unit 104 from the external environment. The housing 114 is comprises material and cladding to enclose the controller 122 and other components. In this way, the housing 114 makes the controller unit 104 explosion proof. The cladding material of the housing 114 can be plastic or any other suitable material. For example the housing 114 can comprise resin for sealing and securing the internal components of the control unit 104. The housing 114 is suitable to be mountable or wearable on the user. In some embodiments, the housing 114 comprises a loop for threaded a belt there through.

The controller unit 104 comprises a processor or controller 122 for controlling the augmented reality apparatus 100. The controller 122 is connected to a power source 116 such as a battery. The power source 116 can be mounted in a separate compartment (not shown) or housed in the same enclosure as the controller 122. By providing the battery 116 in a separate compartment, the housing 114 can provide further shielding.

In some embodiments, the battery 116 is packaged and shielded so that its heat during operation and/or malfunction cannot ignite a gas in the hazardous area 200. Optionally, if the electronics in the control unit 104 require too much power when the apparatus 100 is in the hazardous area 200, then the electronics can be shielded, pressurized or encapsulated preventing an internal spike from igniting vapour. In some embodiments, the housing 114 is rated to at least IP54. The battery 116 in some embodiments, can be external to the control unit 104. In this case, the battery 116 requires careful construction of the electrical contacts to allow the electronics to continue running. The battery 116 is constructed in a way so that the battery 116 cannot generate too much heat during operation or malfunction.

In some embodiments, the controller unit 104 is rated explosion proof in accordance with ATEX 1999/92/EC and or IEC/EN 60079 within a zone 1 hazardous atmosphere. In some embodiments, the controller unit 104 is configured such that a spark cannot be generated with sufficient energy to ignite the gas in the hazardous area and that the controller unit itself cannot generate sufficient heat to do so. At the same time, in some embodiments, the glasses 102 are not zone 1 rated because they can be selectively switched off by the controller unit 104. Advantageously, this means that the glasses 102 do not comprise the battery 116 or capacitors and the glasses 102 pose less of a risk of causing an explosion. This means that the glasses 102 can be made more lightweight because the glasses 102 do not need the same shielding and cladding that the housing 114 requires.

The controller unit 104 is connected to at least one sensor 118 and optionally to a location module 120. The at least one sensor 118 is configured to send a signal to the controller 122 and/or the location module 120 about one or more parameters of the environment. In some embodiments, the at least one sensor 112 mounted on the glasses 102 is configured to additionally or alternatively send a location signal to the location module 120.

The location module 120 is configured to determine the location of the augmented reality apparatus based on one or more signals. The location module 120 can determine the location based on external signals. For example, the location module 120 can determine that a signal has been received from an external beacon indicating a particular location. In other embodiments, the location module 120 can determine the location based on signal processing of received images from the camera 112, or other data. The location module 120 can be software implemented, hardware implemented or a combination of both. In this way, the controller 122 can alternatively carry out the processes of the location module 120.

In some embodiments, the at least one sensor 118 is one or more of the following: a camera, an infrared detector, a microphone, a wireless receiver, a hall sensor, a temperature sensor, a pressure sensor, a radio frequency detector, a global positioning system sensor, or an accelerometer. In this way, the at least one sensor 118 provides a signal and/or information to the controller 122 about the environment. In some embodiments, the at least one sensor 118 sends location information to the controller 122.

As mentioned previously, the control unit 104 is remote from the glasses 102. The glasses 102 are connected to the control unit 104 by a power cable 124 and/or a data cable. The arrangement as shown in FIG. 1 shows a combined power and data cable 124 between the glasses 102 and the control unit 104.

In some embodiments, the components in the control unit 104 are hermetically sealed within the housing 114. This means that the battery 116 does not have to be removed for charging. Indeed, the battery 116 can be charged with an induction charging arrangement (not shown).

When the user wears the glasses 102, the LCD display 108 projects an image on to the lens 106. The controller 122 sends display information stored in memory (not shown) to the LCD display 108 for displaying within the user's field of view. The controller 122 receives information from the camera 112 in the glasses 102. Accordingly, the controller 122 can project information on to particular objects within the user's field of view. In this way, the user's field of view is augmented and the user can benefit from an augmented reality when wearing the augmented reality apparatus 100. The information displayed by the LCD display 108 can be inspection manuals, maintenance guides, component numbers, service instructions, manufacturer details, fault finding guides or any other information relating to the environment where the user is located. The process of generating and implementing an augmented reality is known and will not be discussed in any further detail.

Figure 3:
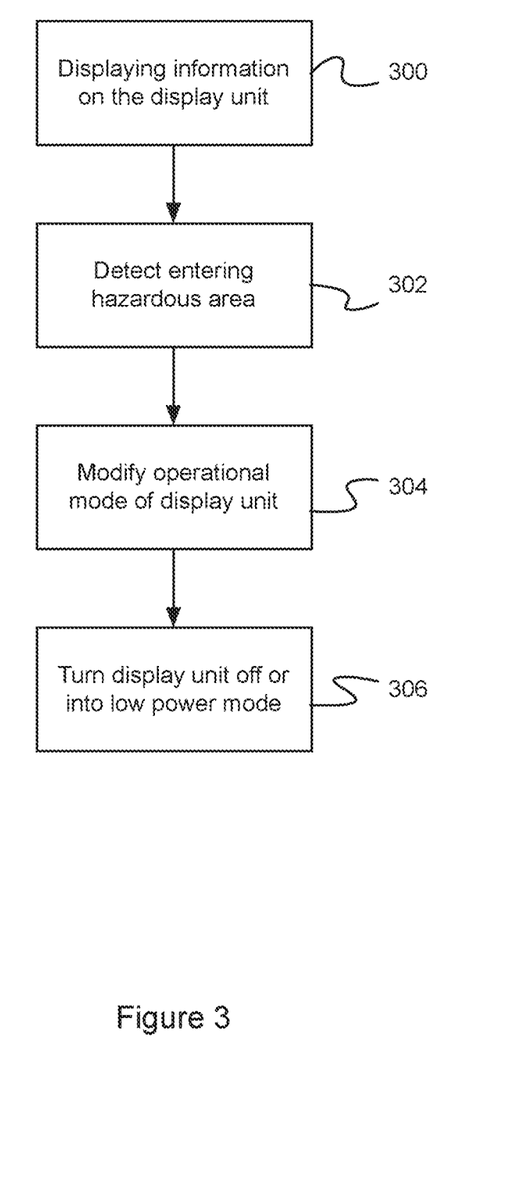
FIG. 3 shows a flow diagram of a control method for the augmented reality apparatus.
Figure 4:
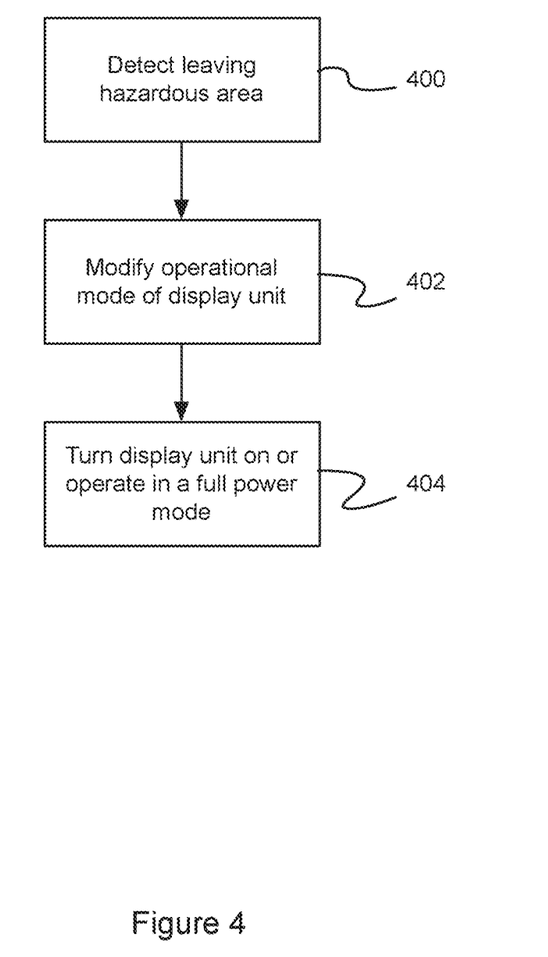
FIG. 4 shows a flow diagram of a control method for the augmented reality apparatus.

Operation of the augmented reality apparatus 100 will now be discussed in reference to FIGS. 2 to 4. FIG. 2 shows a schematic diagram of the apparatus 100 moving into a hazardous area. FIGS. 3 and 4 show a flow diagram of operation of the apparatus 100.

Turning to FIG. 2, the apparatus 100 is located outside a hazardous zone 200 and is currently located in a safe zone 208. A safe zone 208 is an area where the user can operate the augmented reality apparatus 100 in a normal mode of operation. For example, the user can use the apparatus in a full power mode without fearing that the apparatus 100 will cause an explosion.

In contrast, the hazardous zone 200 may be hazardous because the atmosphere is liable to explosion as discussed above in reference to the different zone classifications. For example, some parts of a drilling rig are a hazardous area 200 and may be classified as a zone 1 hazardous area. Accordingly, the user must take precautions when entering the hazardous zone 200. The boundary between the safe zone 208 and the hazardous zone 200 is shown by dotted line A-A. As shown in FIG. 2, the apparatus 100 which is being worn by a user (not shown) moves from the safe zone 208 to the hazardous zone 200. The boundary A-A may a safety margin area 210 between the safe area 208 and the hazardous area 200 rather than a line.

In some embodiments, the apparatus 100 is used in a drilling environment. On a drilling-only environment, the area surrounding the well centre and the shaker room are typically the only zone 1 hazardous areas in the drilling-only environment. This means that a user could inadvertently stray into the zone 1 hazardous areas with the apparatus 100 in an operative mode. Advantageously, the controller unit 104 is configured to automatically change the mode of operation of the display unit 102 according to the location of the apparatus 100. This means that a user will not accidentally stray into a zone 1 hazardous area with the apparatus 100 fully operative.

In some embodiments, the boundary A-A is indicated by a signal 206 which is transmitted by a beacon 204. The signal 206 can be transmitted wirelessly using Wi-Fi signal, Bluetooth, or any other radio frequency signal. Alternatively, the beacon is an infrared beam which delineates the boundary A-A. In other embodiments, the signal 206 from the beacon can be a laser beam. In other embodiments, the signal 206 can be any suitable signal for indicating the location of a boundary between the safe zone 208 and the hazardous zone 200. In some embodiments, the beacon 204 marks the safety margin area 210. This means that if there is some latency in the controller 122 determining that the apparatus 100 has crossed the boundary A-A, the controller 122 modifies the operative mode of the display unit 102 before the apparatus 100 moves beyond the safety margin area 210 and into the hazardous area 200.

Turning to FIG. 3, the method of operating the apparatus 100 will now be discussed. When the apparatus 100 is in the safe zone 208, the apparatus operates in a normal mode of operation. In this way, the information is being displayed on the display unit 102 as shown in step 300.

As the apparatus moves over the boundary A-A the sensor 118 detects the signal 206 from the beacon 204. Additionally or alternatively, one or more sensors 112 in the glasses 102 also detects the signal 206 from the beacon 204. In some embodiments, the beacon 204 is an infrared emitter and the sensor is an infrared detector. When the sensor 118 detects the boundary signal 206, the sensor 118 sends a detection signal to the location module 120. The location module 120 determines that the apparatus 100 has moved into the hazardous zone 200 in dependence of the location information from the infrared signal 206 as shown in step 302.

In some alternative embodiments, the sensor 118 is a wireless receiver and the beacon 204 is a wireless transmitter. The wireless receiver 118 and wireless transmitter 204 can use any suitable wireless protocol for transmitting the signal. For example, the wireless protocol can be Wi-Fi, Bluetooth, Zigbee or any other suitable radio frequency for transmitting and receiving a signal. In some alternative embodiments, the sensor 118 receives a plurality of signals from a plurality of beacons 204. In this way, the location module 120 can triangulate the position of the apparatus 100 based on the plurality of different signals.

In some further embodiments, the location module 120 receives image data from one or more cameras in the controller unit 104 and/or the glasses 102. The location module 120 can compare the received images of the current location with stored images of the hazardous area 200. Accordingly, the location module can apply image recognition techniques to determine whether the apparatus 100 is in the hazardous area 200.

In yet further embodiments, the location module 120 is connected to one or more position sensors 118. The position sensors 118 can comprise accelerometers and/or GPS receivers. Additionally or alternatively, the glasses 102 can comprise one or more accelerometers and/or GPS receivers for sending position information of the apparatus 100 to the location module 120. In some embodiments, the location module 120 determines the position of the apparatus 100 based on a dead reckoning system using a gyro sensor, an accelerometer and/or GPS receivers or other satellite positioning systems.

In other embodiments, the location module 120 is connected to a microphone configured to detect an acoustic signal. Detection of the acoustic signal by the location module 120 means that the apparatus 100 is close to the hazardous area 200.

In other embodiments, the user may have to use an access card or pass through locked security doors in order to enter a hazardous area 200. In some embodiments, the location module 120 receives a signal from an access card or security doors as the user opens and accesses restricted areas.

Once the location module 120 determines that the apparatus 100 is in the hazardous area 200, the location module 120 sends a signal to the controller 122. On receipt of the signal from the location module 120, the controller 122 modifies a mode of operation of the display unit 102 as shown in step 306. In some embodiments the controller 122 imposes a current limit on the connection to the battery 116 so that the electronics cannot draw a current corresponding to spark with sufficient energy to ignite the gas. In this way, the display unit 102 operates in a low power mode as shown in step 308. Furthermore the other components in the controller unit 104 will also operate in a low power mode.

In step 308, the controller 122 can deactivate the display unit 102. In this way, the glasses 102 do not operate normally when the apparatus 100 is in the hazardous zone 200. The LCD display 108 does not display any information on the lens 106.

In some embodiments even though the display unit 102 is deactivated or in a low power mode, one or more location sensors 112 in the glasses 102 continue to operate so that the location module 120 can be updated with the location information of the apparatus 100.

Operation of the apparatus 100 will now be discussed in reference to FIG. 4. FIG. 4 shows a flow diagram of operation of the augmented reality apparatus when the apparatus moves from the hazardous area 200 to the safe area 208.

When the user moves out of the hazardous area 200, the sensor 118 on the controller unit 104 detects the signal 206 from the beacon 204. This is similar to the step 302 as previously discussed. In some embodiments, the sensors 112 in the glasses 102 are still operating and can detect the signal 206. However, if the glasses 102 are inactive, then detection of the signal 206 from the beacon 204 is carried out only by the control unit 104 components.

On detection of the signal 206, the controller 122 modifies a mode of operation of the display unit 102 as shown in step 402. This is similar to the step as previously discussed in reference to step 304. For example, the controller 122 switches the display unit 102 from an inactive or low power mode to an active or full power mode as shown in step 404. This is similar to the step 306 as shown in FIG. 3.

In some embodiments, when exiting the zone 1 hazardous area 200 and carrying out step 400, location module 120 may verify the apparatus 100 location by using the position from the dead reckoning (or similar) as a starting point.

In some embodiments, the control unit 104 and/or the display unit 102 comprises a manually operated interface such as a button (not shown). The button is for manually switching the display unit 102 between different modes of operation (e.g. ON/OFF). Optionally, the controller 122 allows manual selection between the operation modes of the display unit 102 when the apparatus is outside of the hazardous area 200. However, when the apparatus 100 enters the hazardous area 200, the controller 122 prevents the user from switching the display unit 102 on. In this way, the controller 122 receives location information from the location module 120 and determines that the user 20 is attempting to operate the display unit 102 in the hazardous area 200. In some embodiments, the control unit 104 comprises a capacitor and a discharge circuit (not shown) to discharge capacitatively stored charge once the apparatus 100 is in the safe area 208.

In some embodiments, the control unit and/or the glasses 102 comprise a receiver (not shown) configured to receive an external override signal. The external override signal is received from a rig or plant control system. In this way, if the rig control system has detected gas, the display units 102 on all apparatuses 100 are shutdown to prevent an explosion. In this way, the controller 122 receives an external signal that dynamically changes the classification of the zones in the external environment. For example. The rig control system gas sensors have detected gas in previously safe areas 208 which are now classified as hazardous areas 200.

If the display unit 102 is shut down, then this may allow the devices to be used in a zone 1 hazardous area 200 as long as no gas is detected. In some embodiments, the control unit 104 and/or the glasses 102 may comprise or be linked to a user worn gas sensor (not shown). If the gas sensor detects gas, then the controller 122 may optionally transmit a warning to the rig system.

In some embodiments, the glasses 102 may be operable in an emergency mode. This means that in an emergency situation the glasses 102 can help guide people safely away from danger. However, the glasses 102 will require shut down when they enter an area which is classified as hazardous due to the presence of gas.

In another embodiment, the controller is configured to modify the mode of operation of the display unit in dependence of the type of hazardous area. For example, the user may move between different hazardous areas having different levels of classification. For example, the controller 122 changes the mode of operation of the display unit 102 as the apparatus 100 moves between a zone 2 hazardous area to a zone 1 hazardous area. The modification of the mode of operation of the display unit 102 has been previously discussed in reference to FIGS. 3 and 4.

In some embodiments, steps 402, 404 are carried out manually. Once the user is outside the hazardous area, the glasses 102 are repowered by a user action, for example pressing a button. If the user is required to manually activate the glasses 102, then the location determination step of 400 is carried out and the apparatus 100 maintains location awareness to prevent the user from powering back up while still in zone 1 hazardous area 200.

In other embodiments, the glasses 102 in low power mode optionally retain power to memory to allow a quick repowering as opposed to a cold start up.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. An augmented reality apparatus for use in a hazardous area comprising:
   a display unit for providing information within a user's field of view said display unit being mounted in a set of glasses or goggles; and
   a controller configured to control the display unit mounted in a housing arranged to shield the controller from the hazardous area wherein said housing is remote from the display unit;
   wherein the controller is configured to modify the mode of operation of the display unit in dependence of location information indicating that the augmented reality apparatus is in the hazardous area;
   wherein the augmented reality apparatus comprises a location module configured to process location information of the augmented reality apparatus;
   wherein the location module is configured to detect an external signal to determine when the augmented reality apparatus enters the hazardous area; and
   wherein the external signal is a beacon indicating the boundary of the hazardous area.

2. An augmented reality apparatus according to claim 1, wherein the controller is configured to modify the display unit to a low power mode or an inactive mode.

3. An augmented reality apparatus according to claim 1, wherein a power source is mounted in the housing arranged to shield the controller from the hazardous area, wherein the housing is remote from the display unit and the power source is connected to the controller and the display unit.

4. An augmented reality apparatus according to claim 1, wherein when the augmented reality apparatus is in the hazardous area, the display unit is in a low voltage mode, a low current mode or switched off.

5. An augmented reality apparatus according to claim 1, wherein the augmented reality apparatus comprises at least one sensor for detecting the location of the augmented reality apparatus.

6. An augmented reality apparatus according to claim 5, wherein the at least one sensor is one or more of the following: a camera, an infrared detector, a microphone, a wireless receiver, a hall sensor, a temperature sensor, a pressure sensor, a radio frequency detector, a global positioning system sensor, or an accelerometer.

7. An augmented reality apparatus according to claim 1, wherein the location module is configured to determine the location hazardous environment from a camera mounted on the augmented reality apparatus.

8. An augmented reality apparatus according to claim 1, wherein the controller is configured to modify the mode of the display unit when the augmented reality apparatus leaves the hazardous area.

9. An augmented reality apparatus according to claim 8, wherein the controller modifies the mode of the display unit from an inactive mode or a low power mode to an active mode.

10. An augmented reality apparatus according to claim 1, wherein the hazardous area is an atmosphere having a gas, vapour or mist with a zone classification of zone 0, zone 1 or zone 2 or an atmosphere having a dust with a zone classification of zone 20, zone 21 or zone 22.

11. An augmented reality apparatus according to claim 1, wherein the controller modifies the mode of operation of the display unit in dependence of a type of hazardous area.

12. An augmented reality apparatus for use in a hazardous area comprising:
- a controller;
- a display unit for providing information within a user's field of view;
- a sensor communicatively connected to the controller for detecting the location of the apparatus;

wherein the controller, based on input from the sensor, being adapted for detecting whether the apparatus is within or without the hazardous area; and wherein the controller being configured to control the display unit to operate in a mode with reduced power consumption when the apparatus is within the hazardous area;

wherein the controller being configured to control the display unit to operate in an inactive mode, a low power mode or an active mode; and wherein the controller in the low power mode is adapted to limit power drawn from a battery prohibiting spark generation.

13. The augmented reality apparatus according to claim 12, wherein the controller being configured to control the display unit to operate in an emergency mode and show guidance to guide people safely away from danger.

14. The augmented reality apparatus according to claim 12, wherein the controller, based on input from the sensor, being adapted to classify the type of hazardous area; and wherein the controller is configured to modify the mode of operation of the display unit in dependence of a type of hazardous area.

* * * * *